May 18, 1954    D. AMFITHEATROF    2,678,991
MAGNETIC UNIT FOR ELECTRIC AND GAS BURNERS
Filed March 6, 1951    2 Sheets-Sheet 1
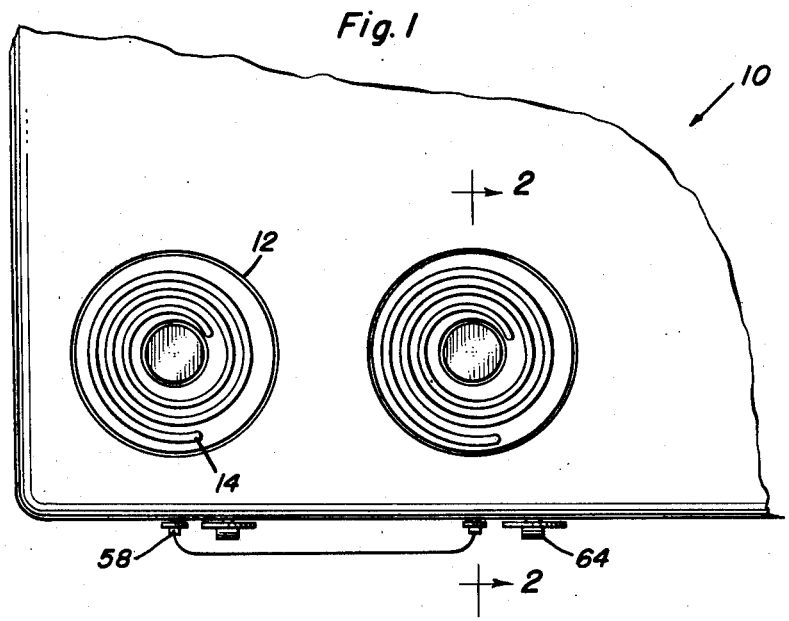
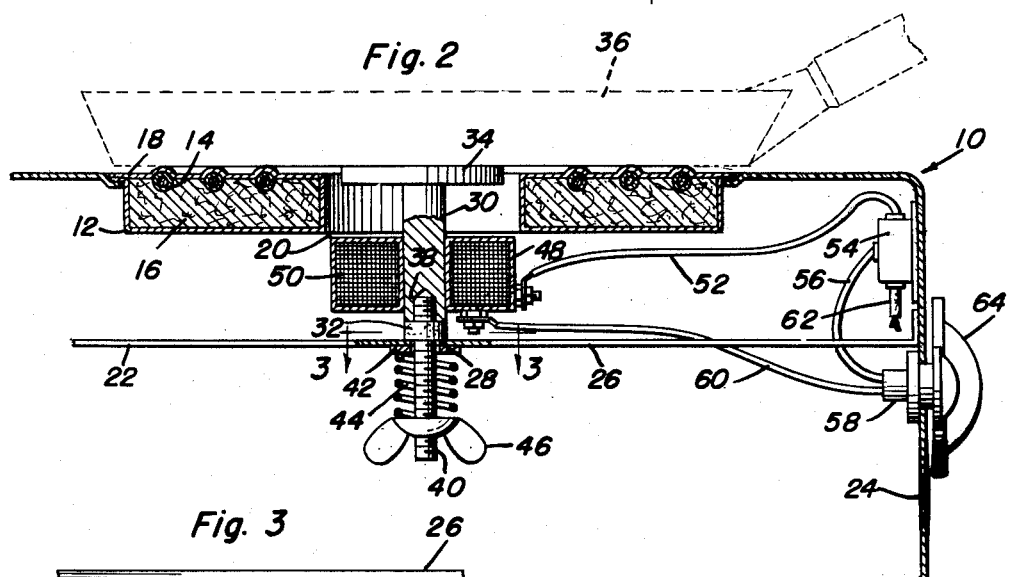
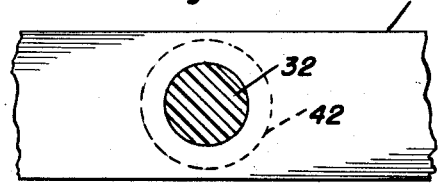
Daniele Amfitheatrof
INVENTOR.

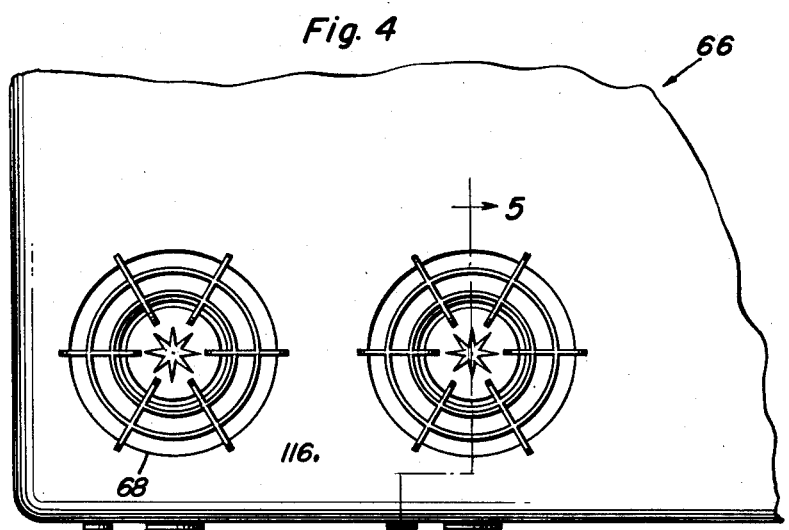
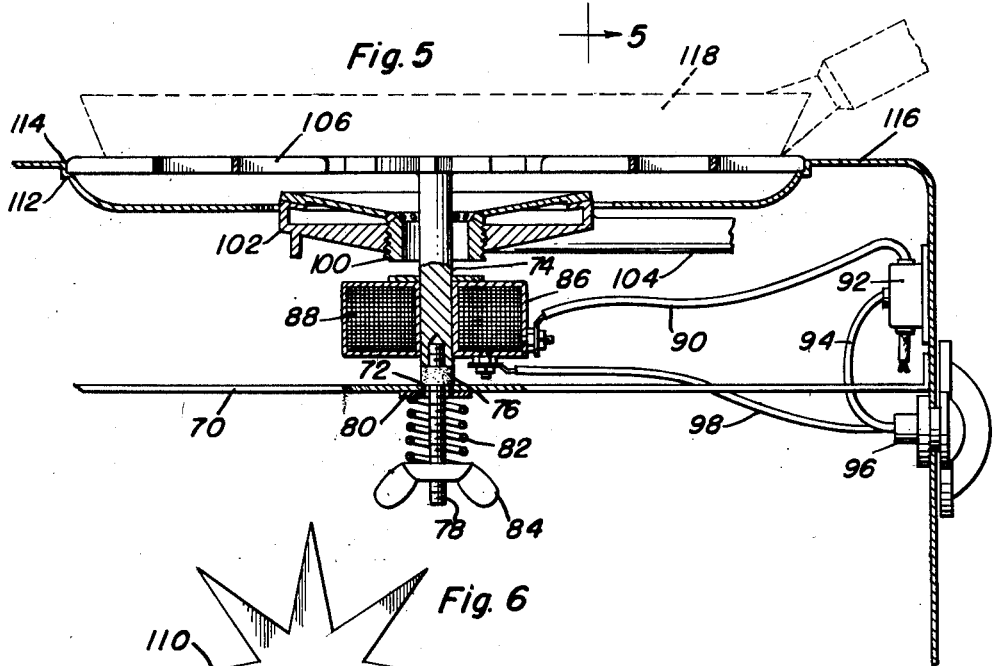
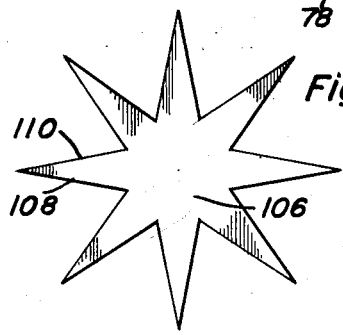

Patented May 18, 1954

2,678,991

UNITED STATES PATENT OFFICE 2,678,991

MAGNETIC UNIT FOR ELECTRIC AND GAS BURNERS

Daniele Amfitheatrof, Los Angeles, Calif., assignor of fifty per cent to Thomas W. Talbot, Santa Monica, Calif.

Application March 6, 1951, Serial No. 214,070

3 Claims. (Cl. 219—37)

This invention comprises novel and useful improvements in a magnetic burner unit, and more particularly pertains to a device for holding a cooking vessel, or the like, on a stove.

The primary object of this invention is to provide a means for a greater area of the cooking vessel when in position on the burners of a stove, thereby speeding up the ordinary time needed for cooking.

A further but equally important object is to provide a means for firmly holding a cooking vessel on a stove whereby it will not fall off either by its own accord or by the intervention of children, or the like, or because of the rocking of the stove, for example, as on a ship.

Other objects of this invention are to be seen in the provision of a magnetic burner unit which is simple and easy to construct and maintain, inexpensive to obtain, and efficient and useful in operation.

These, together with various ancillary objects and features of the invention which will later become apparent as the following description proceeds, are attained by the device, a preferred embodiment of which has been illustrated by way of example only in the accompanying drawings, wherein:

Figure 1 is a partial top plan view of an electric stove illustrating, in particular, a pair of electric burner units;

Figure 2 is a vertical sectional view taken on the plane of the section line 2—2 of Figure 1 and further illustrating a cooking vessel in phantom view;

Figure 3 is a horizontal sectional view taken along the plane of section line 3—3 of Figure 2;

Figure 4 is a top plan view similar to Figure 1 but illustrating a gas burner type of stove;

Figure 5 is a vertical sectional view similar to Figure 2 but taken along the plane of section line 5—5 of Figure 4; and Figure 6 is a top plan view illustrating the special construction of a portion of the invention as adapted to a gas burner stove.

Reference is now made to the accompanying drawings, wherein it will be noted that like numerals designate similar parts throughout the various views.

Considering Figures 1 and 2, it will be seen that the numeral 10 designates a portion of an electric stove or range. At the front thereof are the conventional burner units, as 12, including a spirally arranged electric coil or element 14, insulation 16, and having a cover 18 adapted to fit over the coils. The burner unit 12 is dome shaped and accordingly has an opening 20 at the center thereof.

Below the electric burner unit 12 is a support bracket 22 welded or similarly secured to the inside of the front panel 24 of the stove 10. This bracket consists of a horizontally positioned plate 26 having an aperture 28 suitably positioned therein. Resting above this aperture 28 is a magnetizable rod 30 having a block 32 of nonmagnetic material secured to the lower end thereof and abutting the upper surface of the hole 28.

A flat plate 34 of magnetic material is preferably secured to the upper end of the rod 30 and is positioned, together with the relative position of the aperture 28, centrally of the electric burner 12. Accordingly, this solid plate 34 maintains a coplanar relationship with the burner and is adapted to receive thereon a cooking vessel, as 36.

As a means of securing the rod and plate to the bracket plate 26, there is provided a threaded opening 38 within the lower end of the rod 30. A correspondingly threaded bolt 40 is then screwed into the opening 38. Conventional elements, as the washer 42 and tension spring 44, are then provided, whereupon, by tightening the wing nut 46 on the bolt 40, the rod and plate 30, 34 will remain firmly in place.

An electric coil form 48 consisting of a suitable number of windings 50 is then positioned on the rod 30 intermediate the bracket plate 26 and the plate 34. Leading from the winding 50 is a wire 52 which is connected to one end of a secondary transformer 54, the other end of the same being connected to a wire 56 which, after going through any suitable switch 58, continues back to the winding 50 by way of the lead 60. Suitable primary connections 62 are provided from the transformer 54. If desired, the energy for the coil winding 50 may be controlled by the same switch, as 64, that controls the electric burner coils 14 or, as mentioned, the control may be maintained separately through the switch 58.

From the foregoing, it will be evident that upon energizing the windings 50 of the coil 48 by the switch 58 or 64, the rod 30 and plate 34 will become magnetized. If a cooking vessel is now placed in position on the burner unit, that is, resting on the plate 34, the same will be held firmly in place. Further, by provision of the non-magnetic block 32 between the rod and bracket plate 26, the non-used magnetic pad is reduced, thereby giving relatively greater useful magnetic strength to the effective area of the plate.

The second embodiment as seen in Figures 4-6 illustrates the application of the instant invention to a stove employing gas-type burners. Accordingly, similar elements to those portrayed in the embodiment of Figures 1-3 are to be seen in a partial view of a gas-type stove 66, and burner units, as 68. However, since in this type of stove it is necessary for the production of heat to allow the gas flames to pass upwardly from the gas jet to thereby contact the lower surface of a cooking vessel, some provision must be made in the shape of the magnetic plate.

First, it will be noted that, as in Figures 1-3, there is provided a bracket plate 70 having an aperture 72 therein, a magnetizable rod 74 having a lower non-magnetic block 76, a bolt threaded into the rod 74 through the aperture or hole 72, a washer 80, a spring 82, and a wing nut 84 cooperating to engage the bolt 72 and thereby hold the rod 74 onto the bracket plate 70. Again, as in the previous embodiment, a coil form 86 having suitable windings 88 therein, lead 90, transformer 92, lead 94, switch 96, and lead 98 are all provided to serve a function exactly the same as that set forth in regard to the previous embodiment.

Firmly disposed on the rod 74 slightly above the magnetic coil unit 86 is a gas jet 100 of a conventional nature. The outer periphery of the gas jet 100 is provided with threads whereby a similar internally threaded gas chamber or weld unit 102 may be received thereon. Further, it will be noted that a gas pipe or conduit 104 is connected to the chamber 102, thereby providing an inlet for the gas.

At the uppermost end of the rod 74 is a plate 106 of magnetic material. Unlike the solid round disk 34 of the previous embodiment, the plate 106 is substantially star-shaped, being constructed throughout its outer periphery with an alternate succession of V-shaped projections and V-shaped slots, 108 and 110, respectively. Furthermore, this plate 106 rests in suitably provided ledges 112 around the inner periphery of the opening 114 in the top surface 116 of the stove 66. Therefore, it is believed evident that it will now be understood that the plate 106 provides the entire supporting member for a cooking vessel, as 118.

From the foregoing, it will be apparent that upon energizing the windings 88 by means of the switch 96, the plate 106 will become magnetized. Then, by igniting the gas from the jet 100, the flames resulting therefrom will be allowed to freely pass through the openings 110 in the plate 106 and thereby reach the bottom surface of the vessel 118.

As hereinbefore set out, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. In a stove having a cooking top and an annular heater mounted in said top, a vessel retaining means comprising a magnetizable rod having its axis concentric with said heater, a magnetizing coil on said rod, a flat plate mounted on said rod substantially coplanar with said cooking top, and means for controlling the energization of said coil, a support for said rod, a non-magnetic block interposed between said rod and said support, resilient means urging said rod toward said support.

2. In a stove having a cooking top and an annular heater mounted in said top, a vessel retaining means comprising a magnetizable rod having its axis concentric with said heater, a magnetizing coil on said rod, a flat plate mounted on said rod substantially coplanar with said cooking top, and means for controlling the energization of said coil, a support for said rod, a non-magnetic block interposed between said rod and said support, a bolt threadedly connected with the lower end of said rod, said bolt extending through said block and said support, a nut on said bolt below said support, a tensioning spring interposed between said support and said nut.

3. In a stove having a cooking top and an annular heater mounted in said top, a vessel retaining means comprising a magnetizable rod having its axis concentric with said heater, a magnetizing coil on said rod, a flat plate mounted on said rod substantially coplanar with said cooking top, and means for controlling the energization of said coil, a support for said rod, a non-magnetic block interposed between said rod and said support, a bolt threadedly connected with the lower end of said rod, said bolt extending through said block and said support, a nut on said bolt below said support, a tensioning spring interposed between said support and said nut, said plate being star-shaped.

References Cited in the file of this patent

UNITED STATES PATENTS

| Number | Name | Date |
| --- | --- | --- |
| 2,012,981 | Wilsey | Sept. 3, 1935 |
| 2,356,004 | Price | Aug. 15, 1944 |
| 2,415,688 | Hall, Jr. | Feb. 11, 1947 |
| 2,448,417 | Cecchini | Aug. 31, 1948 |
| 2,497,753 | Arnot | Feb. 14, 1950 |

FOREIGN PATENTS

| Number | Country | Date |
| --- | --- | --- |
| 468,150 | Great Britain | June 30, 1937 |